United States Patent
Cornelius et al.

(10) Patent No.: US 6,360,564 B1
(45) Date of Patent: Mar. 26, 2002

(54) SOL-GEL METHOD OF PREPARING POWDER FOR USE IN FORMING GLASS

(75) Inventors: Lauren K. Cornelius, Painted Post; Adam J. G. Ellison, Corning; Ljerka Ukrainczyk, Painted Post, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/488,300

(22) Filed: Jan. 20, 2000

(51) Int. Cl.⁷ .................... C03B 8/02; C03B 37/016
(52) U.S. Cl. .................... 65/395; 65/17.2; 65/440; 65/901; 423/338
(58) Field of Search .................... 65/17.2, 395, 440, 65/901; 423/338

(56) References Cited

U.S. PATENT DOCUMENTS

| | | |
|---|---|---|
| 4,462,974 A | 7/1984 | Pastor et al. |
| 4,465,656 A | 8/1984 | Pastor et al. |
| 4,605,428 A | 8/1986 | Johnson, Jr. et al. ............ 65/2 |
| 4,680,048 A | 7/1987 | Motoki et al. ................. 65/17 |
| 4,786,618 A | 11/1988 | Shoup ........................ 501/12 |
| 4,810,415 A | 3/1989 | Winkelbauer et al. . 252/183.13 |
| 5,008,219 A | 4/1991 | Hara ......................... 501/12 |
| 5,071,674 A | 12/1991 | Nogues ...................... 427/57 |
| 5,123,940 A | 6/1992 | DiGiovanni et al. ......... 65/3.12 |
| 5,145,510 A | 9/1992 | Saito et al. ................. 65/18.1 |
| 5,314,518 A | 5/1994 | Ito et al. .................... 65/3.11 |
| 5,342,809 A | 8/1994 | Poulain et al. ............... 501/12 |
| 5,912,397 A | 6/1999 | Baik et al. .................. 65/17.2 |
| 6,008,309 A | * 12/1999 | Baumann et al. ............. 528/9 |
| 6,127,306 A | * 10/2000 | Husing et al. ............. 502/158 |

* cited by examiner

*Primary Examiner*—Sean Vincent
(74) *Attorney, Agent, or Firm*—Milton M. Peterson

(57) ABSTRACT

A sol-gel method of preparing a powder for use in forming a glass is provided, along with methods of preparing glasses and glass fibers from the powder. The inventive method allows for the incorporation of a wide range of elements and compositions into a homogeneous glass or glass fiber that is substantially free of hydroxide groups. In addition, dopants incorporated into glasses prepared by the inventive method are uniformly distributed throughout the glass structure.

31 Claims, No Drawings

SOL-GEL METHOD OF PREPARING POWDER FOR USE IN FORMING GLASS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to methods for producing high purity glasses, in particular, to an improved sol-gel method for preparing powders that can be processed into high purity glasses for use in optical fibers.

Optical communication through the use of glass fibers, commonly known as "fiber-optic communication," has increased dramatically over the past decade. The growing demand for fiber-optic systems has prompted the development of various types of glasses that, when processed into fibers, improve the efficiency, capacity, and functionality of fiber-optic networks. The improved properties are typically obtained by incorporating new elements or compositions into the glass structure. For example, glasses doped with rare-earth elements are being used successfully as "optical amplifiers" in fiber-optic systems.

It has been found that conventional methods for preparing fiber optic glasses are often unsuitable for preparing these improved glasses. One problem is that the dopants or other additives tend to cluster at an atomic level within the glass. Rare earth dopants are particularly susceptible to this problem because the elements tend to associate with each other when subjected to high temperatures. Because dopants are usually added to alter the optical properties of the glass, it is desirable to have a more uniform distribution. Another problem is that volatile dopants are vaporized and lost to the atmosphere when high temperature vapor methods, such as chemical vapor deposition, are used.

These problems have been partially addressed by the use of a sol-gel preparation method. As disclosed in U.S. Pat. No. 5,123,940 to DiGiovanni et al., for example, the glass precursors (a metal alkoxide "host" material and any dopant materials) are dissolved in a solvent, and the mixture is subsequently hydrolized and condensed into a sol. The sol s applied by dip-coating to the inner surface of a fused silica tube, where it is dried and then the tube collapsed to complete the formation of a glass fiber. Because the glass precursors are applied to the surface of the tube in solution form rather than by flame vapor deposition, volatile dopants are not lost from the system. Sol-gel methods such as that disclosed by DiGiovanni et al. thus allow for the incorporation of a greatly expanded range of elements and compositions into the glass and resulting optical fiber. Furthermore, mixing of the glass precursors on a molecular scale (in the solution) prior to melting results in a more homogeneous glass and more even distribution of dopants. The lower glass-formation temperature characteristic of the sol-gel process also contributes to improved uniformity of dopant distribution. As disclosed in U.S. Pat. No. 5,314,518 to Ito et al., the rare earth elements are not as likely to cluster at lower temperatures.

Despite these clear advantages, the sol-gel method has not gained widespread use for the manufacture of optical glass fiber cores. While dopants are distributed more uniformly than with conventional vapor deposition or batch annealing techniques, clustering still occurs because the dopants aggregate while in solution. A more significant problem with the sol-gel method is that it is very wet—in other words, residual OH groups reside in the sol and the gel. If these OH groups are not removed before the gel is processed into a glass, they are incorporated into the glass structure. The incorporated hydroxide groups cause light having a wavelength of 1390 nm to be absorbed by the doped glass article. The overtone of this OH absorption peak at 1390 nm interferes with the telecommunications transmission wavelength of 1550 nm. As a result, a fiber made from the glass will have poor optical quality for telecommunications applications and will be considered optically impure. A common procedure for removing hydroxide groups involves introducing a chlorine gas flow over the gel as it is sintered into a glass at high temperatures. This technique is described in further detail in U.S. Pat. No. 5,123,940 to DiGiovanni et al. Despite the removal of a significant amount of OH, however, this technique is not effective for reducing OH in the resulting glass fiber to levels adequate for optical communication and amplification applications.

Thus, there is a need for improvements to the sol-gel method of preparing optical fibers. In particular, there exists a need for a sol-gel preparation method that accomplishes uniform distribution of dopants in a substantially hydroxide-free glass, which can subsequently be rendered into fiber form via standard fiber-draw techniques.

BRIEF SUMMARY OF THE INVENTION

Accordingly, it is an object of the present invention to provide a sol-gel method for preparing a substantially hydroxide-free glass.

Another object of the present invention is to provide an improved sol-gel method for preparing a glass, where the glass contains less hydroxide groups than at least some other glasses prepared by conventional sol-gel methods.

An additional object of the present invention is to provide a method for preparing a substantially hydroxide-free glass, where a wide range of elements and compositions can be incorporated into the glass.

Still another object of the present invention is to provide a method for preparing a glass in which dopants are uniformly distributed.

Yet another object of the present invention is to provide a method for preparing a substantially hydroxide-free glass fiber, where a wide range of elements and compositions can be incorporated into, and uniformly distributed in, the fiber.

Other objects of the invention will become apparent to one skilled in the art who has the benefit of the specification and the prior art.

One aspect of the invention which satisfies one or more of the foregoing objects, in whole or in part, is a method that includes the steps of selecting precursor compounds for a glass material, mixing the precursor compounds in a solvent to form a solution, hydrolyzing and condensing the solution, treating the solution with bromine to remove water and hydroxide groups drying the solution until only a powder remains, and heating the powder to remove excess organic material, such that the powder is suitable for processing into a glass.

Another aspect of the invention is a method as previously defined, where at least one of the precursor compounds contains a dopant to be incorporated into the glass.

Still another aspect of the invention is a method as previously defined, where, in addition to a dopant, one of the precursor compounds is a complexing ligand that prevents aggregation of the dopant in the powder and in the resulting glass.

Yet another aspect of the invention is a method as previously defined, where the solvent is water.

Another aspect of the invention is a method as previously defined, where a bromide-containing compound is used to remove water and hydroxide groups from the solution.

Still another aspect of the invention is a method as previously defined, where the solution is hydrolyzed by first adding an acid to the solution, and then by adding a base to the solution.

Another aspect of the invention is a method for forming a glass fiber that includes the steps of preparing a powder by the method as previously defined, dispersing the powder in a solvent to form a suspension, depositing the suspension on the inner surface of a glass tube, and heating the tube to convert the suspension into a glass and to collapse the tube into a glass fiber.

DETAILED DESCRIPTION OF THE INVENTION

The inventive method of preparing powders suitable for processing into a glass is generally performed by selecting precursor materials for the glass, mixing the precursor materials in a solvent, hydrolizing the mixture with an acid and/or a base, allowing the mixture to condense, drying the mixture into a powder, and calcining the powder to remove organic material.

While one advantageous application of this invention relates to optical glass fibers for use in telecommunications systems, it is believed that the inventive method is useful for preparing many different types of glass products. To this end, there are few limitations on the selection of precursor materials used in the method, and of course, selection of particular precursor materials in particular amounts will necessarily depend upon the type of glass product desired to be made. Any mix of precursor materials that can (1) be formed into a glass and (2) solubilized or dispersed in aqueous or organic solvent are contemplated for use herein. Example precursors include alkoxides, acetates, organosilane, organogermanates, hydroxides, oxides, halides, and any other inorganic, metal-organic, or organometallic compounds, adducts, complexes and polymers. The above examples also include double, triple and other multiple metal alkoxides and other inorganic, metal-organic or organometallic compounds, adducts, complexes, and polymers containing multiple elements (e.g., boron trimethylsiloxide, bismuth germanate, diethoxysiloxane-s-butylaluminate, sodium bis(trimethylsilyl)amide, or potassium antimony tartarate.) The most common precursors for optical applications are silicon alkoxides such as tetraethylorthosilicate (TEOS). Other alkoxides used specifically in the formation of optical fibers include antimony(III)ethoxide and aluminum isopropoxide.

Various dopants may also be incorporated into or selected as precursor materials. As used herein, the term "dopants" refers to ions or compounds that are incorporated into a bulk glass material in order to alter the properties of that material. Among other functions, dopants can impart optical activity, change refractive index, increase or decrease viscosity, stabilize glass, and reduce liquidus. Examples of optically active ions are rare earth elements such as neodymium, erbium, cesium, praseodymium, samarium, europium, terbium, dysprosium, holmium, thulium, and ytterbium, and ions of transition metal elements such as nickel and chromium. Examples of refractive index modifiers are aluminum, germanium, phosphorus, zirconium, and titanium, which tend to raise the refractive index, and boron, which when substituted for cations with higher atomic numbers, tends to lower it. Examples of viscosity reducing dopants are lead, aluminum, boron, phosphorus, zinc, the alkali metals, and the alkaline earth elements. An example of a glass stabilizing and liquidus reducing dopant is antimony. Any other suitable dopant known to those skilled in the art is contemplated for use in the inventive method. Ionic dopants, such as those listed above, may be supplied as alkoxides (e.g., germanium tetraethoxide), as salts (e.g., erbium trichloride), or as any other suitable compounds known to those skilled in the art. In addition, optically-active rare earth dopants may be supplied as nitrates or halides of the rare earth elements (e.g., erbium (III) nitrate, see discussion of complexing ligands below).

As has been described, dopants and other additives tend to aggregate in solution, which can lead to undesirable clustering in certain regions of the resulting glass. It has been found that a more uniform distribution of dopants may be obtained by the use of complexing or chelating ligands. Therefore, complexing or chelating ligands are also contemplated for use herein as precursor materials. Complexing or chelating agents contemplated for use herein include: nitrates, tri-fluoroacetate, 6,6,7,7,8,8,8-heptafluoro-2,2-dimethyl-3,5-octanedionate, 2,4-pentanedionate, sodium tripolyphosphate, hexametaphosphoric acid, ethylenediaminetetraacetic acid, nitrilotriacetic acid, N-dihydroxyethylglycine, ethylenebis(hydroxyphenylglycine), acetylacetone, tri-fluoroacetylacetone, thenoyltrifluoroacetone, tartaric acid, citric acid, gluconic acid, 5-sulfosalicyclic acid, ethylenediamine, diethylenetriamine, triethylenetetramine, triaminotriethylamine, monoethanolamine, triethanolamine, N-hydroxyethylethylenediamine, dipyridil, o-phen-anthroline, salicylaldehyde, disulfopyrocatechol, chromotropic acid, oxine,8-hydroxy-quinoline, oxine-sulfonic acid, dimethylglyoxime, salicylaldoxime, disalicylaldehyde 1,2-propylenediimine, tetraphenyl-porphin, phthalocyanine, toluenedithiol (Dithiol), dimercaptopropanol, thioglycolic acid, potassium ethyl xanthate, sodium diethyl-dithiocarbamate, dithizone, diethyl dithiophosphoric acid, thiourea, dibenzo-[18]-crown-6, hexa-methyl-[14]-4,11-dieneN$_4$, (2.2.2-cryptate), polyethyleneimines, polymethacryloylacetone, poly(p-vinylbenzyl-iminodiacetic acid), nitrilotrimethylenephosphonic acid, ethylene-diaminetetra(methylenephosphonic acid), and hydroxyethylidenedi-phosphonic acid. One example of a dopant complexed with a chelating ligand is erbium (III) nitrate.

Once the precursor materials have been selected, an appropriate solvent or group of solvents must be selected such that all of the precursors can be solubilized and mixed together. It is expected that those skilled in the art will be able to choose an appropriate solvent or group of solvents on the basis of the precursor materials that have been selected. Suitable solvents may be acidic or basic, aqueous or organic, or a mixture of aqueous and organic. For example, two suitable organic solvents are ethanol and isopropanol. Alternatively, water may be selected as the only solvent that is used in the inventive method. The amount of solvent is not restricted, but in most cases use of a minimum amount is preferred. Of course, when precursors are already commercially supplied in solution or in liquid form, the use of an additional solvent or solvents may be unnecessary.

The precursor materials are dissolved in the selected solvent or solvents and then mixed according to any mixing method known to those skilled in the art. Examples of suitable mixing methods include a magnetic stir bar, a motor driven impeller blade, or a jet mixer. In the next step of the inventive method, the solubilized precursor mixture is hydrolized. The hydrolysis may also be carried out in any manner known to those skilled in the art, but will usually take place in the presence of an acid or a base.

One method of hydrolizing the precursor mixture is to add a base to the mixture. The base can be added to the mixture in any amount that will initiate hydrolization or, alternately, in an amount sufficient to exceed a pH of about 9 in the mixture. A second, two-step hydrolization method, is to first add an acid to the mixture, and then a base to the mixture. In general, the acid should be added in an amount sufficient to achieve a pH of about 0.5 to about 5.5 in the mixture, followed by the base in an amount sufficient to exceed a pH of about 9 in the mixture. One suitable base for use in the hydrolysis step is ammonium hydroxide, which can be prepared by combining ammonia and water to obtain a solution comprising 15–28 percent ammonia. Suitable acids include hydrofluoric acid and nitric acid. Any other acids or bases known to those skilled in the art may also be used in the inventive method.

Once hydrolysis has been initiated, condensation and polycondensation proceeds. Condensation may be carried out under basic conditions or, alternately, with the pH of the mixture in excess of about 9. If necessary, condensation of the precursor mixture can be initiated or assisted by any other means known to those skilled in the art.

Hydrolysis and condensation of the mixture may be carried out at room temperature. Alternatively, the temperature can be varied in order to control the rates of hydrolysis and condensation.

As has been described, one of the problems associated with using a sol-gel method to prepare optical glass is that excess water and hydroxide groups in the solution (and gel) can degrade the optical qualities of the resulting glass. Prior methods have used a chlorine gas at the sintering stage of the glass formation process to remove hydroxide groups. Despite some success, however, this high-temperature technique is not effective for reducing OH in the resulting glass fiber to levels adequate for optical communication and amplification applications.

Applicants have developed a technique for solving this problem. It has been found that chemical drying with the use of bromine (and specifically bromide) is a very effective means for removing hydroxide groups and water from the sol-gel system and thus also from the resulting glass. Unlike the previous use of chlorine gas, the bromine treatment step occurs prior to any high-temperature stage of the glass preparation process. Thus, water and hydroxide groups are removed well prior to any melting or densification of the precursors into a glass. It is contemplated that bromine can be introduced along with other precursors during the initial mixing step, during the hydrolysis and condensation steps, or during any other step that occurs prior to drying of the mixture (for example, during the optional fluorination and particle flocculation step described below). Bromine can be introduced into the mixture as an acid (e.g., hydrobromic acid), bromine gas, any bromine salt, or in any other form or composition known to those skilled in the art. Bromine-containing compounds contemplated for use herein include ammonium bromide, potassium bromide, aluminum bromide, hydrogen bromide, silicon bromide, cesium bromide, titanium bromide, cuprous bromide, lithium bromide, rubidium bromide, sodium bromide, beryllium bromide, magnesium bromide, calcium bromide, strontium bromide, cerous bromide, barium bromide, praseodymium bromide, chromous bromide, chromic bromide, tungsten bromide, manganese bromide, ferrous bromide, ferric bromide, cobaltous bromide, rhodium bromide, nickel bromide, palladium bromide, platinum bromide, silver bromide, gold tribromide, boron tribromide, thallium bromide, stannous bromide, stannic bromide, phosphorus pentabromide, phosphorus tribromide, bismuth bromide, selenium tetrabromide, tellurium tetrabromide, and zinc bromide. In addition to those disclosed above, other group IIIA (e.g., gallium bromide), IVA (e.g., germanium bromide), and VA (e.g., antimony(III)bromide) bromine-containing compounds are also contemplated for use herein. Bromine can be added to the mixture in any amount that is effective for removing hydroxide groups and water from the sol-gel system and thus also from the resulting glass. Alternately, bromine can be added in an amount such that bromine ions comprise at least 5 weight percent of the mixture.

After the initiation of hydrolysis followed by condensation, fine particles will begin to form in the mixture of solubilized precursor materials. An optional step in the inventive method is to add hydrofluoric acid to the mixture once the particles have begun to form. The purpose of this optional step is twofold. First, hydrofluoric acid serves as a flocculating agent; that is, it assists in the process by which fine particles, suspended in a liquid medium, form stable aggregate colloidal particles. Flocculation of the mixture can be desirable because, by stimulating the formation of larger colloidal particles, the time for drying the mixture into a powder is significantly reduced. The second reason for adding hydrofluoric acid to the precursor mixture is to partially fluorinate the powder, and thus the resulting glass. The incorporation of halides, particularly fluorine, can impart desirable features to a glass. For example, it is known that the incorporation of fluorine lowers both the viscosity and the melting temperature of an oxide glass.

Therefore, while fluorine (and other halides) can be introduced as and mixed with the other precursor materials during the mixing step of the inventive method, it is more efficiently introduced where it can also serve a dual function as a flocculating agent. A suitable hydrofluoric acid solution can be prepared by combining hydrogen fluoride and water to obtain a solution comprising 20–48 percent hydrogen fluoride. Hydrofluoric acid can be added to the mixture in any amount that is effective to flocculate the mixture, or in any amount necessary to obtain the desired level of fluorine in the resulting glass. Typically, hydrofluoric acid is added in an amount such that fluorine ions comprise up to 10 weight percent of the mixture. Alternatively, if fluorine is not a desired component of the target glass, and yet flocculation is desirable, any suitable flocculating agent known to those skilled in the art may be used in the inventive method.

Likewise, if flocculation is not desirable, and yet fluorine is a desired component, fluorine can (as mentioned above) be introduced as and mixed with other precursor materials. For example, fluorine can be introduced into the glass by selecting fluorine-containing compounds as precursor materials (such as fluoride salts). Suitable fluorine-containing compounds include group IIIA (e.g., aluminum or gallium fluoride), group IVA (e.g., silicon or germanium tetrafluoride), group VA (e.g., antimony(III)fluoride or antimony(V)fluoride), and group VIIA (e.g., bromine trifluoride or bromine pentafluoride) fluoride compounds.

At any point after condensation proceeds and particles begin to form, the precursor mixture can be dried to a powder. The drying step can be carried out in any manner known to those skilled in the art. One suitable method for drying the precursor mixture is to simply expose the mixture to the ambient environment and allow the volatile components to evaporate. Another suitable method is to spray-dry the mixture by forcing it through a nozzle. Whatever method is used, the result of the drying step is a dry powder.

The dry powder is calcined by heating in a furnace at temperatures between about 400 to about 600 degrees Celsius. Calcination of the dry powder may be carried out in any suitable vessel known to those skilled in the art. For example, the powder may be calcined in a fused quartz or porous refractory crucible. Acceptable crucible materials include, but are not limited to, silica, alumina, and zirconia. The calcination step burns off unwanted organic material, and renders the powder suitable for consolidation or melting into a homogeneous glass. The powder can be calcined at temperatures higher than 600 degrees Celsius if necessary to remove additional volatile components, such as other halides used to dry and/or purify the glass. The calcined powders thus produced by the inventive method are extremely dry, highly homogeneous, and exhibit small particle size (on the order of 100 nanometers).

The powder prepared by the inventive method can be processed into glass, and in particular glass suitable for use in optical fibers, by (1) melting, (2) consolidation of a monolith made from the powder, or (3) impregnation of the powder in a clad-glass tube followed by collapse of the tube into a glass fiber preform.

The first processing method is accomplished by simply heating the dry powder to a temperature that causes the powder to melt into a glass. One method of melting the powder into a glass comprises the following steps. As described above, the powder is first calcined in a porous refractory crucible that can be composed of, among other materials, silica, alumina, or zirconia. After calcination, the crucible is covered with a lid of the same material as the crucible and transferred to a furnace pre-heated to from about 900 to about 1350 degrees Celsius. The purpose of this heating step is to densify the powder prior to full melting at higher temperatures. Such densification prevents undesirable deviations from the target stoichiometry of the glass, which can occur if the powder is subjected to melt temperatures without an intermediate heating step. To accomplish densification, the furnace is maintained at about 900 to about 1350 degrees Celsius for at least 10 minutes up to any length of time that results in the desired degree of densification. Alternately, the furnace is maintained at this temperature from about 1 hour to about 4 hours.

After this time period has elapsed, the furnace temperature is increased to between about 1300 and about 1800 degrees Celsius. The crucible is held at this increased temperature for at least 10 minutes up to any length of time required to melt the powder into a glass of the desired quality. Alternately, the furnace is maintained at this temperature from about 1 hour to about 20 hours. At the end of this period, the crucible is removed and the contents cooled to a glass. The recovered glass is annealed at anywhere between about 450 and about 550 degrees Celsius, or at any other temperature sufficient to anneal the glass. The resulting glass can be formed into a glass fiber by any method known to those skilled in the art, with one example being the "double crucible" method.

The second processing method, consolidation of a monolith, is accomplished by dispersing the powder in a solvent to form a suspension, impregnating the suspension into a mold, drying the impregnated suspension to form a gel, and then heating the gel to form a glass in the molded shape.

The third processing method, which in fact forms a preform suitable to prepare glass fiber, is accomplished by dispersing the powder in a solvent to form a suspension and using spraying, spin-coating, or dip-coating techniques to deposit the suspension on the inner surface of a clad-glass tube. The tube is then heated to convert the deposited suspension into a core glass material, and to collapse the clad-glass tube around the core glass. Optical fibers with approximately graded index profiles can be produced by depositing different layers of suspended powder on the inside of the clad-glass tube, where each layer incorporated a powder with a unique refractive index.

In addition to the methods described above, the powder prepared by the inventive method can be processed into glass by any suitable techniques known to those skilled in the art. It is also contemplated that a glass may be prepared directly from the condensed mixture of particles without first drying the mixture to a powder. In other words, as described in U.S. Pat. No. 5,123,940 to DiGiovanni et al., for example, the condensed mixture may be dried to a gel state, and then sintered directly into a glass. Any other technique or method known in the art for processing a condensed sol-gel solution into a glass is contemplated for use herein.

Glasses prepared by the inventive method exhibit very low OH content. The concentration of OH groups in a particular glass can be measured with the use of Fourier Transform Infrared Spectroscopy (FTIR). The OH concentration value obtained using FTIR is known as the "$\beta$—OH" of the glass. The $\beta$—OH for glasses prepared by the inventive method is generally less than or equal to 0.05. In addition to low OH content, the fine and highly homogeneous powders that are produced by the inventive sol-gel method reduce melting time and temperature (which aids in retention of volatile components and prevents clustering of rare earth elements), and allow for a purity comparable to glasses prepared by chemical vapor deposition techniques. As described earlier, interatomic separations of dopant materials are optimized by the use of complexing ligands in the precursor mixture.

Among other applications, the inventive method is ideal for preparing powders that can be processed into glasses which contain optical amplification compositions. One such composition is antimony oxide. Due to its volatility, antimony oxide cannot be easily incorporated into a glass fiber via chemical vapor deposition techniques. Yet it is readily incorporated into a glass or glass fiber using the inventive method. Likewise, the inventive method is well-suited for the preparation of optical-quality glasses that have high melt viscosities. It is difficult to prepare such glasses with standard batch melting techniques because the high viscosities hinder the stirring of the melted glass. As a result, when prepared using conventional batch annealing techniques, glasses with high melt viscosities exhibit poor optical quality (unless higher temperatures are used to reduce the viscosity, in which case volatile components are lost from the glass). The inventive method avoids the problems associated with batch melting, and thus permits fabrication of optical quality glass despite high melt viscosities.

The invention is further illustrated, but is not intended to be limited by, the following examples.

EXAMPLE 1

The following precursors are selected for the preparation of a low phonon oxyfluorinated glass: tetraethylorthosilicate (TEOS), antimony (III) ethodxide, aluminum isopropoxide, and erbium (III) nitrate. Isopropanol and water are selected as solvents. 379.4 ml of the TEOS, 126.4 ml of the antimony (III) ethoxide, and 91.9 g of the aluminum isopropoxide are placed in teflon beaker with 200 ml of isopropanol. The mixture is stirred for 30 minutes. A solution containing 0.886 g of the erbium (III) nitrate, 47.6 g of potassium bromide (the selected bromine drying agent), and 100 ml of deionized water is added to the mixture, which is then stirred for an additional 15 minutes. Hydrolysis and condensation are initiated by adding 300 ml of ammonium hydroxide and 150 ml of isopropanol to the mixture. Vigorous stirring of the mixture produces a thick and homogeneous white suspension. After stirring for 30 minutes, a mixture of 60 ml hydrofluoric acid and 60 ml deionized waster is added dropwise to the white suspension. The suspension tends to consolidate into a monolithic gel unless vigorously stirred. The suspension is air-dried, pulverized, and then calcined in a furnace by heating up to 425 degrees Celsius in a porous refractory crucible.

The crucible is covered with a lid and transferred to a furnace pre-heated to 1100 degrees Celsius. After 1 hour, the furnace temperature is increased to 1425 degrees Celsius. The sample is held at this temperature for 1 hour. At the end of this period, the crucible is removed and the sample is cooled to glass in the crucible. The recovered glass is annealed at 450 degrees Celsius.

The β—OH of the glass is less than 0.05, and laser efficiency measurements performed on a fiber made from this glass are equal to the theoretical value indicating little or no energetic cross-relaxation between erbium ions.

EXAMPLE 2

The following precursors are selected for the preparation of a low phonon oxyfluorinated glass: tetraethylorthosilicate (TEOS), antimony (III) ethodxide, aluminum isopropoxide, and erbium chloride. Water is selected as the solvent. 1115.9 ml of the TEOS, 617 ml of the antimony (III) ethoxide, and 86.2 g of the aluminum isopropoxide are placed in a teflon beaker. The mixture is stirred for one hour at room temperature. A first solution is prepared by dissolving 80 g of ammonium bromide (the selected bromine drying agent) in 200 ml of water. A second solution is prepared by dissolving 5.5 g of the erbium chloride in 200 ml of water. Both the first and second solutions are then added to the mixture of alkoxides, and the resulting mixture is stirred for fifteen minutes. Hydrolysis and condensation are initiated by adding 800 ml of ammonium hydroxide (28 percent ammonia in water) and 200 ml of water to the mixture. Vigorous stirring of the mixture produces a thick and homogeneous white suspension. After stirring for 30 minutes, 41 ml of hydrofluoric acid is added dropwise to the white suspension. The suspension tends to consolidate into a monolithic gel unless vigorously stirred. The suspension is air-dried, pulverized, and then calcined in a furnace by heating up to 425 degrees Celsius in a porous refractory crucible.

The crucible is covered with a lid and transferred to a furnace pre-heated to 1100 degrees Celsius. After 4 hours, the furnace temperature is increased to 1450 degrees Celsius. The sample is held at this temperature for 6 hours. At the end of this period, the crucible is removed and the sample is cooled to glass in the crucible. The recovered glass is annealed at 450 degrees Celsius.

The β—OH of the glass is 0.03, and the spectroscopy of the glass is comparable to or better than that of glasses melted from reagent-grade batch materials.

EXAMPLE 3

The following precursors are selected for the preparation of a glass: tetraethylorthosilicate (TEOS), antimony (III) ethodxide, aluminum isopropoxide, and erbium nitrate pentahydrate. Water is selected as the solvent. 1273.5 ml of the TEOS, 687 ml of the antimony (III) ethoxide, and 55.8 g of the aluminum isopropoxide are placed in a teflon beaker. The mixture is stirred for one hour at room temperature. Hydrolysis and condensation are initiated by adding 49.4 ml of hydrofluoric acid and 100 ml of distilled deionized water to the mixture, which is allowed to react for thirty minutes. A solution containing 6.7468 g of the erbium nitrate pentahydrate and 100 ml of water is then added to the mixture. The mixture is stirred for 15 minutes, after which a solution containing 100 g of ammonium bromide (the selected bromine drying agent) and 133 ml of water is added. Hydrolysis and condensation are continued by vigorously stirring the mixture while adding, dropwise, 1200 ml of ammonium hydroxide (28 percent ammonia in water) and 300 ml of ethanol. Upon complete addition of the ammonium hydroxide and ethanol, a thick and homogeneous white suspension is formed. The suspension is air-dried, pulverized, and then calcined in a furnace by heating up to 500 degrees Celsius in a porous refractory crucible.

The crucible is covered with a lid and transferred to a furnace pre-heated to 1100 degrees Celsius. After 4 hours, the furnace temperature is increased to 1450 degrees Celsius. The sample is held at this temperature for 6 hours. At the end of this period, the crucible is removed and the sample is cooled to glass in the crucible. The recovered glass is annealed at 450 degrees Celsius.

The β—OH of the glass is less than 0.05, and the spectroscopy of the glass is comparable to or better than that of glasses melted from reagent-grade batch materials. A fiber drawn from the glass using a double crucible method has the highest theoretically achievable 980 nm-pumped 1550 nm laser efficiency, indicating that energetic cross-relaxation between erbium ions is minimized.

EXAMPLE 4

The following precursors are selected for the preparation of a viscous high-silica glass: tetraethylorthosilicate (TEOS), antimony (III) ethodxide, aluminum isopropoxide, and erbium nitrate pentahydrate. Water and ethanol are selected as the solvents. 586.0 ml of the TEOS, 53.0 ml of the antimony (III) ethoxide, and 28.2 g of the aluminum isopropoxide are placed in a teflon beaker. The mixture is stirred for one hour at room temperature. Hydrolysis and condensation are initiated by adding 4.9 ml of concentrated nitric acid, 16 ml ethanol, and 6 ml water to the mixture, which is allowed to react for thirty minutes. A solution containing 2.4400 g of the erbium nitrate pentahydrate and 20 ml of water is then added to the mixture. The mixture is stirred for 15 minutes, after which a solution containing 32 g of ammonium bromide (the selected bromine drying agent) and 60 ml of water is added. Hydrolysis and condensation are continued by vigorously stirring the mixture while adding, dropwise, 400 ml of ammonium hydroxide (28 percent ammonia in water) and 100 ml of ethanol. Upon complete addition of the ammonium hydroxide and ethanol, at thick and homogeneous white suspension is formed. The suspension is air-dried, pulverized, and then calcined in a furnace by heating up to 500 degrees in a porous refractory crucible.

The crucible is covered with a lid and transferred to a furnace pre-heated to 1100 degrees Celsius. After 4 hours, the furnace temperature is increased to 1575 degrees Celsius. The sample is held at this temperature for 6 hours. At the end of this period, the crucible is removed and the sample is cooled to glass in the crucible. The recovered glass is annealed at 550 degrees Celsius.

The β—OH of the glass is less than 0.05, and the spectroscopy of the glass is comparable to or better than that of glasses melted from reagent-grade batch materials.

EXAMPLE 5

The following precursors are selected for the preparation of a viscous high-silica glass: tetraethylorthosilicate (TEOS) and lithium nitrate. Water and ethanol are selected as the solvents. 893.0 ml of the TEOS is placed in a teflon beaker. Hydrolysis and condensation are initiated by adding 20 ml of concentrated nitric acid, 200 ml ethanol, and 80 ml distilled deionized water to the mixture, which is then stirred for three hours at room temperature. A solution containing 40.5 g of potassium bromide (the selected bromine drying agent), 11.7 g of the lithium nitrate, and 200 ml of distilled deionized water is added to the mixture. After stirring for two hours, hydrolysis and condensation are continued by vigorously stirring the mixture while adding dropwise, 500 ml of ammonium hydroxide (28 percent ammonia in water) and 100 ml of ethanol. Upon complete addition of the ammonium hydroxide and ethanol, a thick and homogeneous white suspension is formed. The suspension is air-dried, pulverized, and then calcined in a furnace by heating up to 550 degrees Celsius in a porous refractory crucible.

The crucible is covered with a lid and transferred to a furnace pre-heated to 1100 degrees Celsius. After 4 hours, the furnace temperature is increased to 1650 degrees Celsius. The sample is held at this temperature for 6 hours. At the end of this period, the crucible is removed and the sample is cooled to glass in the crucible. The recovered glass is annealed at 550 degrees Celsius.

When a comparable composition is melted into a glass using standard batch materials (sand as silica), a comparatively inhomogeneous glass with a high defect concentration is obtained.

What is claimed is:

1. A method for preparing powder for use in forming a glass, comprising the steps of:
    selecting precursor compounds for the glass, wherein at least one of said precursor compounds is a glass-forming material;
    selecting a solvent for said precursor compounds, wherein said precursor compounds are soluble in said solvent;
    mixing said precursor compounds in said solvent to form a mixture;
    hydrolizing said mixture;
    inducing or permitting said mixture to condense, such that colloidal particles form in said mixture;
    treating said mixture with bromine to remove water and hydroxide groups from said mixture;
    drying said mixture to form a powder; and
    calcining said powder, wherein the calcined powder is suitable for processing into a glass.

2. The method of claim 1, wherein at least one of said precursor compounds contains a dopant to be incorporated into the glass.

3. The method of claim 2, wherein said dopant is optically active.

4. The method of claim 3, wherein said optically-active dopant is an optically-active rare earth element.

5. The method of claim 4, wherein said optically-active rare earth element is selected from the group consisting of cesium, praseodymium, neodymium, samarium, europium, terbium, dysprosium, holmium, erbium, thulium, and ytterbium.

6. The method of claim 5, wherein said optically-active rare earth element is erbium.

7. The method of claim 2, wherein the dopant-containing precursor compound comprises a nitrate of a halide of an optically-active rare earth element.

8. The method of claim 7, wherein said optically-active rare earth element is selected from the group consisting of cesium, praseodymium, neodymium, samarium, europium, terbium, dysprosium, holmium, erbium, thulium, and ytterbium.

9. The method of claim 7, wherein the dopant-containing precursor compound is erbium (III) nitrate.

10. The method of claim 2, wherein at least one of said precursor compounds is a complexing ligand, wherein said complexing ligand prevents aggregation of said dopant in said powder.

11. The method of claim 1, wherein water is the solvent used to solubilize the precursor compounds.

12. The method of claim 1, wherein said mixture is hydrolized with a base.

13. The method of claim 12, wherein said base is ammonium hydroxide.

14. The method of claim 1, wherein said hydrolizing step comprises the following steps in the following order:
    adding an acid to said mixture; and
    adding a base to said mixture.

15. The method of claim 1, wherein said step of inducing or permitting said mixture to condense occurs in the presence of a base.

16. The method of claim 15, wherein said base is ammonium hydroxide.

17. The method of claim 1, further comprising the step of adding a fluorine-containing compound to said mixture, such that the resulting powder is at least partially fluorinated.

18. The method of claim 17, wherein said fluorine-containing compound is selected from the group consisting of a fluoride salt and a fluorine-containing acid.

19. The method of claim 17, wherein said fluorine-containing compound is selected from the group consisting of a Group IIIA fluoride compound, a Group IVA fluoride compound, a Group VA fluoride compound, a Group VIIA fluoride compound, hydrofluoric acid, and ammonium fluoride.

20. The method of claim 1, wherein at least one of said precursor compounds is a silicon alkoxide.

21. The method of claim 20, wherein said silicon alkoxide is tetraethylorthosilicate.

22. The method of claim 1, wherein said step of treating the mixture with bromine comprises adding a bromine-containing compound to the mixture.

23. The method of claim 22, wherein said bromine-containing compound is selected from the group consisting of a Group IIIA bromide compound, a Group IVA bromide compound, a Group VA bromide compound.

24. The method of claim 22, wherein said bromine-containing compound is selected from the group consisting of potassium bromide, cesium bromide, ammonium bromide, and aluminum bromide.

25. The method of claim 1, wherein said step of treating the mixture with bromine comprises adding a hydrobromic acid to the mixture.

26. The method of claim 1, further comprising the step of processing the calcined powder into a glass.

27. The method of claim 26, wherein said processing step comprises melting said powder into a glass.

28. The method of claim 26, wherein said processing step comprises:
   selecting a solvent for said powder, wherein said powder is dispersible in said solvent;
   dispersing said powder in said solvent to form a suspension;
   impregnating said suspension into a mold;
   drying the impregnated suspension to form a gel; and
   heating the gel to form the desired glass.

29. A method for forming a glass fiber, comprising the steps of:
   providing a glass tube;
   providing a powder prepared by the method of claim 1;
   selecting a solvent for the powder, wherein the powder is dispersible in said solvent;
   dispersing the powder in said solvent to form a suspension;
   depositing said suspension on the inner surface of said tube; and
   heating said tube to convert said suspension into a glass and collapse said tube into a glass fiber.

30. A method for preparing powder for use in forming silica glass, comprising the steps of:
   selecting precursor compounds for the silica glass, wherein at least one of said precursor compounds is a silicon alkoxide;
   selecting a solvent for said precursor compounds, wherein said precursor compounds are soluble in said solvent;
   mixing said precursor compounds in said solvent to form a mixture;
   hydrolizing said mixture;
   inducing or permitting said mixture to condense, such that colloidal particles form in said mixture;
   treating said mixture with bromine to remove water and hydroxide groups from said mixture;
   drying said mixture to form a powder; and
   calcining said powder, wherein the calcined powder is suitable for processing into silica glass.

31. A method for preparing powder for use in forming a glass, comprising the steps of:
   selecting precursor compounds for the glass, wherein said precursor compounds comprise
       at least one glass-forming material;
       at least one dopant to be incorporated into the glass; and
       a complexing ligand, wherein said complexing ligand prevents aggregation of said dopant in the glass;
   selecting a solvent for said precursor compounds, wherein said precursor compounds are soluble in said solvent;
   mixing said precursor compounds in said solvent to form a mixture;
   hydrolizing, said mixture;
   inducing or permitting said mixture to condense, such that colloidal particles form in said mixture;
   treating said mixture with bromine to remove water and hydroxide groups from said mixture;
   drying said mixture to form a powder; and
   calcining said powder, wherein the calcined powder is suitable for processing into a glass.

* * * * *